Patented Aug. 30, 1938

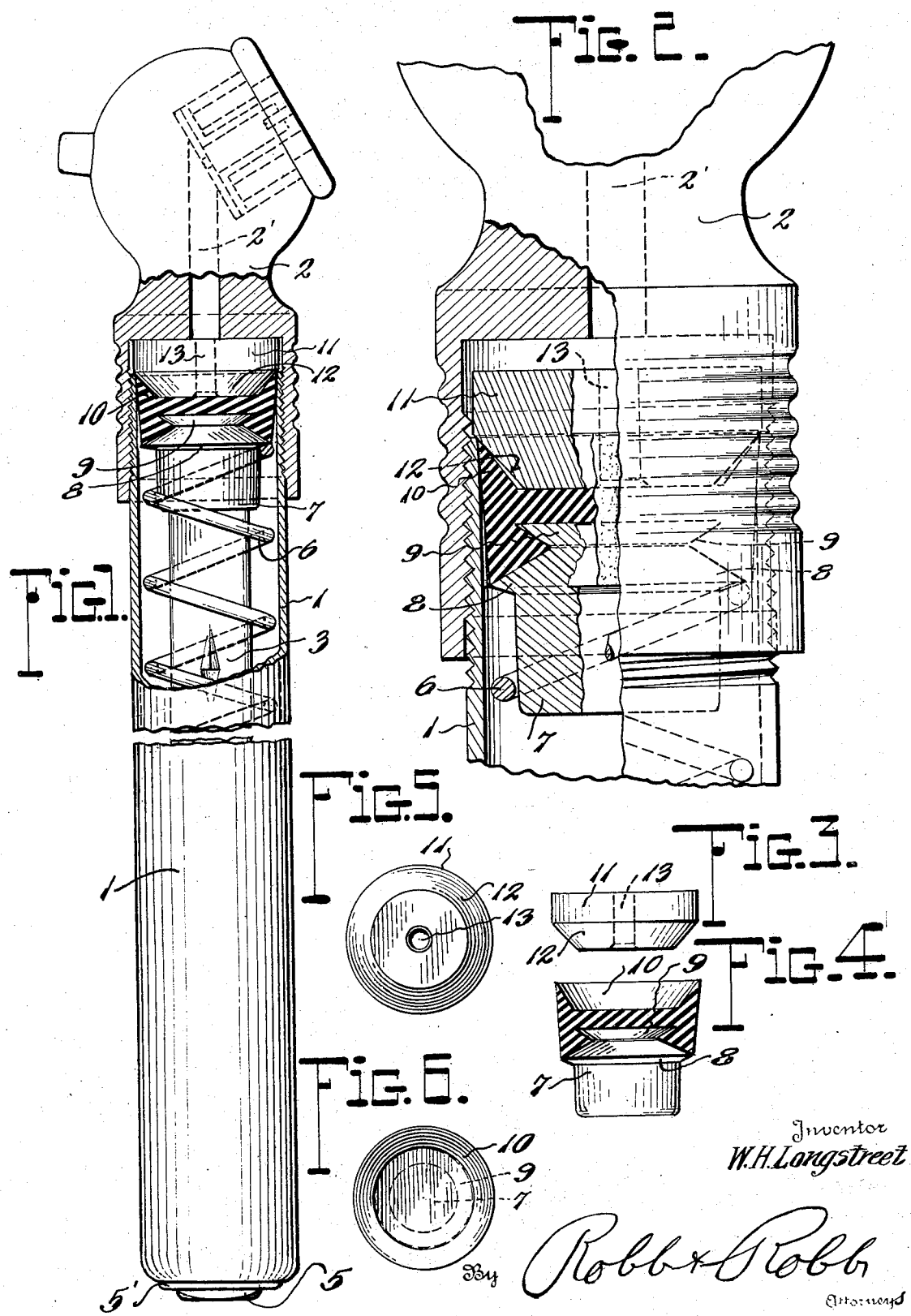

2,128,619

UNITED STATES PATENT OFFICE 2,128,619

PRESSURE FLUID GAUGE

Walter H. Longstreet, Brooklyn, N. Y., assignor to Acme Air Appliance Company, Inc., Brooklyn, N. Y., a corporation of New York Application June 23, 1937, Serial No. 149,983

2 Claims. (Cl. 73—111)

The present invention relates to improvements in pressure fluid gauges and more particularly to that type disclosed in my prior Patent No. 2,078,-148, dated April 20, 1937.

In the prior devices of this type, it has been the universal custom to provide the plunger with a flexible cup washer of leather to prevent leakage of the pressure fluid operating against the plunger. The useful or effective life of these washers is comparatively short due to their absorptive characteristic and tendency to dry out. Neatsfoot oil, generally used to preserve the leather, penetrates the pores and dirt becomes embedded in the leather, setting up wear which soon causes variation and inaccuracy of the gauging function. The gauge has to be set originally to compensate for this wear, but further than this, the oil has a tendency to leak past the plunger and to get on the gauge bar before the instrument is sold. In this condition of soil, purchasers refuse to buy, resulting in the return of many for replacement.

Furthermore, in the course of time, the leather becomes dry, and tends to shrink away and curl in from contact with the cylinder wall, allowing pressure fluid to pass and destroying accuracy of the instrument.

These washers cannot readily be replaced due to the manner of assembly of the parts, and factory servicing is impracticable due to expense in time and labor, having regard for the selling price of the article.

The purpose of the present invention, therefore, is to overcome these difficulties by the provision of a new type of plunger characterized particularly by the use of a mouldable oil proof washer, unaffected by heat, oil or the presence of foreign matter, while maintaining its flexibility and effectiveness against leakage of the pressure fluid past the plunger.

Owing to the mouldability of the washer, it is found possible to make the plunger a unitary structure, greatly facilitating the manufacture and assembly of the parts, in addition to the prolongation of life and accuracy of the instrument due to the nature of the material used.

A further object of my invention is the provision of a spreader member, functioning not only to maintain the plunger skirt in proper position to receive the pressure fluid, but also serving to establish an interlocking engagement of the air chuck and cylinder or housing in the assembly operation.

Other and further objects and advantages of the invention will be hereinafter set forth and the novel features thereof defined by the appended claims.

In the drawing:

Fig. 1 is a longitudinal sectional view of an embodiment of my invention;

Fig. 2 is a greatly enlarged fragmentary sectional view of the chuck end of the gauge just before the chuck is screwed home;

Fig. 3 is a detail view of the spreader member used in my invention;

Fig. 4 is a detail view of the plunger showing the cup washer in section;

Fig. 5 is a bottom plan view of the spreader member; and

Fig. 6 is a top plan view of the plunger.

Like reference characters designate corresponding parts in the several figures of the drawing.

Referring to the drawing, 1 indicates the cylinder or housing of the gauge having one end thereof externally threaded to receive the internally threaded air chuck 2. Within the housing is mounted the gauge bar 3, suitably calibrated as customary and slidable through the retainer thimble 5, which is held in place by spinning the end of the cylinder inwardly against the reduced wall 5' of said thimble.

Within the casing is the usual plunger return spring 6 which acts to hold the thimble 5 seated and the plunger 7 in its normal position shown in Figs. 1 and 2.

The gauge bar 3 as usual coacts with the plunger 7 which is of the special construction now to be set forth. The plunger comprises a metal body of a dimension at one end to fit in the end of the spring 6. At its upper portion is formed an annular collar 8 constituting a spring seat at one side. Above the collar, the diameter is reduced and again flares outwardly to form a top collar or flange 9 relatively smaller than the collar 8. This produces an annular V-shaped groove between the collars.

About this upper end is moulded a cup washer of oil-proof material in the nature of synthetic rubber, such as "Duprene" or the like, noted for its resiliency or rubber-like characteristics, its ability to withstand heat and resistance to swelling when boiled or soaked in oil or water.

As seen best in Fig. 4, the washer is formed with a depression 10, the base of which is a substantial thickness of the substance seated on and attached to the head of the body, which supports the walls of the cup against collapse when subjected to pressure. The walls of the cup at the top taper to a thin skirt or lip, while the exterior of the cup tapers toward the collar 8. The diameter at the top just fits the interior diameter of the cylinder so that only this extreme lip contacts with the cylinder, eliminating drag on the cylinder wall in the movements of the plunger.

The attachment of this cup washer by vulcanization and structural inlock with the body produces an integral unit with a flexible lip of long life and wearproof material which maintains accuracy of gauging throughout service.

I preferably employ in combination with this plunger a spreader unit or disk 11 having a tapering or conical lower end, as indicated at 12; and an air passage 13 therethrough. This member serves several important functions. The diameter of the disk is slightly larger than that of the cylinder so as to seat on the entrance to the latter in such position that the taper 12 projects into the cup 10 and acts as a stop to prevent pressure of the spring from causing the skirt to be deformed.

The taper portion, therefore, coacts with the flexible lip of the washer and tends to hold this lip in contact with the wall of the cylinder as long as the plunger is in its uppermost position. Under this condition, no accidental curling in of the washer member is possible at the time the pressure is applied to the plunger and the pressure itself maintains this position of the lip after the plunger leaves the initial position, thereby insuring against leakage of the pressure medium past the plunger in the operation of gauging. Owing to the cooperation of the taper 12 with the recess 10 of the washer, the plunger is maintained centralized.

A further function of this member takes place in the assembly operation of the gauge. As the chuck 2 is screwed into its final position, it contacts with the top of the unit 11 and further slight pressure tends to press the entrance of the cylinder outwardly sufficiently to establish an interlock with the internal thread of the chuck and this practically prevents any possibility of accidental unscrewing of the chuck. As a matter of fact, tests prove that it is very difficult to unscrew this chuck after the action above described even with a tool. Obviously, this is a simple expedient for locking the parts of the gauge device in the barrel by means of the spreader unit.

In the use of the gauge, the chuck is applied to the tire nipple in the usual manner to unseat the valve in the chuck and admit air through the chuck passage 2' and passage 13 of the spreader member. The pressure of the fluid medium then moves the plunger down the cylinder against the tension of the spring 6, carrying with it the gauge bar which is projected from the end of the case through the thimble 5 at the lower end of the same. The indicia on the gauge bar will give the pressure reading.

Removal of the gauge device from the tire stem allows the plunger to return to its normal position under the action of the spring 6, while leaving the bar in its outward position for reading purposes. A slight pressure on the bar will return it to its innermost position cooperating with the plunger, as shown in Fig. 1.

Having thus described my invention, what I claim as new and desire to secure by Letters Patent is:

1. In a pressure fluid gauge, the combination of a cylindrical casing, an air chuck having a sleeve extension adapted to fit over the outer extremity of the casing, a plunger member in said casing having a flexible skirted cup-shaped washer secured to and enclosing one side of the plunger, a separate spreader unit having a truncated conical portion for engaging the mouth of the casing to expand the same into tight engagement with the sleeve extension when the casing and air chuck portions of the gauge are put together, said conical portion constituting spreading means normally engaging the free extremity of the skirt to hold the same against the inner wall of the casing, the truncated portion of said spreader constituting stop means for limiting the spreading action aforesaid by engagement thereof with the portion of the washer enclosed by said skirt.

2. In pressure fluid gauges, the combination of a cylindrical casing, an air chuck connected to one end of said casing, a plunger member in said casing having a flexible skirted washer attached thereto, and a spreader unit seated on the end of the casing and held by the air chuck, said unit having a tapered extension cooperating with the skirt of the washer to normally hold the latter against the wall of the casing and the plunger centralized in the casing, including separate engaging means for limiting the degree of co-operative engagement of the skirt with the spreader unit, said spreader unit comprising a body having greater diameter than the casing and arranged to be clamped against the end of the same by the air chuck, said unit tapering extension being arranged for forcing the end of the casing to expand into engagement with the air chuck to establish an interlock between the chuck and casing, said tapering extension also cooperating with the skirt of the washer to prevent leakage of pressure past the plunger.

WALTER H. LONGSTREET.